United States Patent
Li et al.

(10) Patent No.: US 11,219,041 B2
(45) Date of Patent: Jan. 4, 2022

(54) RESOURCE ALLOCATION METHOD AND ROAD SIDE UNIT

(71) Applicant: YULONG COMPUTER TELECOMMUNICATION SCIENTIFIC (SHENZHEN) CO., LTD., Shenzhen (CN)

(72) Inventors: Jian-Hui Li, Shenzhen (CN); Ming Jiang, Shenzhen (CN); Yi-Xue Lei, Shenzhen (CN); Qian Zheng, Shenzhen (CN); Chen-Lu Zhang, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 757 days.

(21) Appl. No.: 16/070,512

(22) PCT Filed: Aug. 29, 2016

(86) PCT No.: PCT/CN2016/097164
§ 371 (c)(1),
(2) Date: Jul. 16, 2018

(87) PCT Pub. No.: WO2017/121123
PCT Pub. Date: Jul. 20, 2017

(65) Prior Publication Data
US 2021/0204306 A1 Jul. 1, 2021

(30) Foreign Application Priority Data
Jan. 15, 2016 (CN) .......................... 201610028065.6

(51) Int. Cl.
*H04M 11/04* (2006.01)
*H04W 72/12* (2009.01)
*H04W 4/46* (2018.01)
*H04W 4/90* (2018.01)
*G08G 1/09* (2006.01)
*G08G 1/00* (2006.01)
*H04B 7/155* (2006.01)

(52) U.S. Cl.
CPC ........ *H04W 72/1231* (2013.01); *G08G 1/091* (2013.01); *G08G 1/22* (2013.01);
(Continued)

(58) Field of Classification Search
CPC ..... H04W 72/1231; H04W 4/46; H04W 4/90; H04W 76/10; H04W 8/22; H04W 8/24;
(Continued)

(56) References Cited

U.S. PATENT DOCUMENTS 8,792,492 B2 * 7/2014 Chen ................ H04L 45/745
370/392
9,102,320 B2 * 8/2015 McGee ................ B60W 20/16
(Continued)

FOREIGN PATENT DOCUMENTS

CN 1403988 A 3/2003
CN 101369970 A 2/2009
(Continued)

*Primary Examiner* — Stephen M D Agosta
(74) *Attorney, Agent, or Firm* — ScienBiziP, P.C.

(57) ABSTRACT

A resource allocation method is provided, the method includes: receives a resource scheduling request by a first side unit (RSU) sent from a first vehicle to everything (V2X) communication group which comprises vehicles in a same driving direction; allocating communication resources for the first V2X communication group. A road side unit is also provided. By utilizing embodiments of the present disclosure, rationality of resource allocation can be improved, qualities of vehicle communication links and channels in the communication group is stable and a performance of vehicle networking can be fully realized.

10 Claims, 7 Drawing Sheets

(52) U.S. Cl.
CPC .............. *H04B 7/155* (2013.01); *H04W 4/46* (2018.02); *H04W 4/90* (2018.02)

(58) Field of Classification Search
CPC ..... H04W 16/24; H04W 24/00; H04W 24/02; G08G 1/091; G08G 1/22; G08G 1/09; H04B 7/155; H04B 17/309; H04B 17/318; H04B 17/382; H04B 7/15507; H04B 7/2606; H04L 41/0803; H04L 41/0873; H04L 1/0013; H04L 1/08; H04L 1/1671; H04L 1/1835; H04L 1/1854; H04L 1/1887; H04L 1/1896
See application file for complete search history.

(56) References Cited

U.S. PATENT DOCUMENTS

| | | | | |
|---|---|---|---|---|
| 9,300,423 | B2* | 3/2016 | Rubin | H04W 56/0025 |
| 9,440,605 | B2* | 9/2016 | Vadgama | G06Q 30/0645 |
| 10,403,140 | B2* | 9/2019 | Banvait | B60W 30/12 |
| 2003/0129982 | A1* | 7/2003 | Perini | H04W 36/18 455/442 |
| 2013/0194108 | A1* | 8/2013 | Lapiotis | G08G 1/096775 340/905 |
| 2014/0051346 | A1* | 2/2014 | Li | H04W 4/90 455/3.01 |
| 2014/0120955 | A1* | 5/2014 | Padden | H04W 36/32 455/456.6 |
| 2016/0073318 | A1* | 3/2016 | Aguirre | H04W 36/32 455/436 |
| 2017/0303140 | A1* | 10/2017 | Li | H04W 36/04 |

FOREIGN PATENT DOCUMENTS

| | | |
|---|---|---|
| CN | 103269520 A | 8/2013 |
| CN | 105657842 A | 6/2016 |
| WO | 2014015470 A1 | 1/2014 |
| WO | 2015032436 A1 | 3/2015 |

* cited by examiner

RESOURCE ALLOCATION METHOD AND ROAD SIDE UNIT

CROSS-REFERENCE TO RELATED APPLICATIONS

This application claims priority of Chinese Patent Application No. 201610028065.6, entitled "resource allocation method and road side unit," filed on Jan. 15, 2016 in the SIPO (State Intellectual Property Office of the People's Republic of China), the entire contents of which are incorporated by reference herein.

FIELD

The embodiments of the present disclosure relates to a technical field of communication, specifically a resource allocation method and a road side unit.

BACKGROUND

Information exchange between Vehicle-to-everything (Vehicle to X, V2X) is the key technology for intelligent transportation system in the future. It can establish communication between vehicles and other vehicles, vehicles and base stations, and vehicles and nomadic devices. Thus, traffic information such as real-time road conditions, roads information, and pedestrians information can be obtained, driving safety and traffic efficiency can be improved, and congestion can be reduced. Information exchange can include information exchange between a vehicle and a vehicle (V2V), information exchange between a vehicle and an infrastructure (V2I), and information exchange between a vehicle and a nomadic device. Among them, the V2V refers to a direct or indirect communication between vehicles. There are two main scenario definitions for the V2V: one is that the vehicle communicates with the base station through an uplink link, and then the base station communicates with a target vehicle through a downlink, that is a V2V communication based on a Uu link. The other is that the vehicle communicates with a road side unit (RSU) through a PC5 link, and then the RSU communicates with the base station through the uplink link, the base stations communicates with the target vehicle through the downlink link, that is a V2V communication based on a hybrid communication of the Uu link and PC5 link.

The vehicles involved in network access are different from access characteristics of traditional cellular subscribers. Cellular user terminals such as mobile phones and tablets, usually have higher requirements for power consumption control, and communication channel environment is relatively fixed due to more time spent in indoor application scenarios. However, compared s with mobile phones and other terminals, requirements of the vehicles on power consumption limit can be relatively loose, and a higher processing complexity can be supported. The communication channel environment can be changed rapidly because the vehicles are often moving with a variable speed. Switching between different Access points (AP) can be more frequent due to a combination of fast and slow motion, therefore they are different from the traditional cellular subscribers at technical levels, such as resource scheduling. If a vehicle wants to perform a V2V communication, it must first request for resource scheduling to the base stations, just like the traditional cellular subscribers. However, due to a mobility of the vehicle, the vehicle may switch frequently between different cells. The V2X communication based on the PC5 link is interrupted easily because of the mobility of the vehicle. The channel quality is unstable due to vehicular driving environment, thus communication time delay and timeliness of resource utilization can be influenced greatly, and it is not conducive to the performance of an Internet of vehicles.

SUMMARY

The technical problem to be solved by embodiments of the present disclosure is to provide a resource allocation method and a road side unit, for solving a problem of low performance of the Internet of Vehicles as a V2X communication link is easily interrupted and channel quality is unstable.

To solve these problems, a first embodiment of the present disclosure provides a resource allocation method, which includes:

A first road side unit (RSU) receives a resource scheduling request sent from a first vehicle-to-everything (V2X) communication group under a resource allocation method;

Allocating communication resources for the first V2X communication group;

Wherein, the first V2X includes vehicles in a same driving direction.

Wherein, according to the driving direction of the first V2X communication group, the first RSU sends resource occupancy information of the first V2X communication group to the second. RSU, which is in the driving direction and adjacent to the first to make the second RSU remove occupied resource and reallocate communication resource for the first V2X communication group or the second V2X communication group, when the first V2X communication group drives into a coverage area of the second RSU and has a resource conflict with the second V2X communication group.

Wherein, the first V2X communication group comprises vehicles and network-side infrastructures; or The first V2X communication group is a vehicle-to-vehicle (V2V) direct communication group, the vehicle initiating a communication to communicate directly with a target vehicle; or The first V2X communication group is a V2V relay communication group, the vehicle initiating the communication to communicate with the target vehicle through a relay node, the relay node comprising a cellular user terminal, a vehicle, or an RSU providing, a relay communication service.

If the first V2X communication group comprises the vehicles and the network-side infrastructures, wherein the first RSU obtains a traffic density of the driving road section of the first V2X communication group, and compares the obtained traffic density with a preset density threshold by the first RSU;

If the obtained traffic density is less than the preset density threshold, allocates resource for the vehicles in the first V2X communication groups according to the resource scheduling request of the first V2X communication group, and allows the vehicles to keep the allocated resources at the driving road section, informs the second RSU of the resource occupancy information of the first V2X communication group;

lithe obtained traffic density is more than the preset density threshold, every time that the vehicle in the first V2X communication group initiates a resource scheduling request, allocates resource for the vehicles in the first V2X communication group according to an allocation principle based on polling or equal proportion.

Wherein, the method further includes:

The first RSU pre-configures a resource pool for traffic safety warning for the first V2X communication group;

Receives safety warning information broadcast by the first V2X communication group using the resource pool, and sends the safety warning information to the other RSU within a coverage area of the first RSU, to make the other RSU broadcast the safety warning information within their own coverage.

A second embodiment of the present disclosure provides an RSU which includes:

A receiving module, configured to receive a resource scheduling request sent from a first vehicle-to-everything (V2X) communication group, which comprises vehicles in a same driving direction;

An allocation module, configured to allocate communication resources for the first V2X communication group.

Wherein, the RSU further includes:

A sending module, configured to send a resource occupancy information of the first V2X communication group to the second RSU in the driving direction and adjacent to the first RSU, according to the driving direction of the first V2X communication group, to make the second RSU remove occupied resource and reallocate communication resource for the first V2X communication group or the second V2X communication group, when the first V2X communication group drives into a coverage area of the second RSU and has resource conflict with the second V2X communication group.

Wherein, the first V2X communication group comprises vehicles and network-side infrastructures; or The first V2X communication group is a vehicle-to-vehicle (V2V) direct communication, group, the vehicle initiating communication to communicate directly with a target vehicle; or The first V2X communication group is a V2V relay communication group, the vehicle initiating communication to communicate with a target vehicle through a relay node, the relay node comprising a cellular user terminal, a vehicle, or an RSU providing a relay communication service.

Wherein, if the first V2X communication group comprises the vehicles and the network-side infrastructures, the receiving module is also configured to obtain a traffic density of the driving road section of the first V2X communication group, and compare the obtained traffic density with a preset density threshold;

If the obtained traffic density is less than the preset density threshold, the allocation module is also configured to allocate resource liar the vehicles in the first V2X communication groups according to the resource scheduling request of the first V2X communication group, and allow the vehicles to keep the allocated resources at the driving section, and inform the second RSU of the resource occupancy information of the first V2X communication group;

If the obtained traffic density is more than the preset density threshold, the allocation module is also configured, every time that the vehicle in the first V2X communication group initiates a resource scheduling request, allocate resource for the vehicles in the first V2X communication group according to an allocation principle based on polling or equal proportion.

Wherein, the allocation module is also configured to pre-configure a resource pool for traffic safety warning for the first V2X communication group;

The receiving module is also configured to receive safety warning information broadcast by the first V2X communication group using the resource pool; and the sending module is also configured to send the safety warning information to the other RSU within a coverage area of the first RSU to make the other RSU broadcast the safety warning information within their own coverage.

The present disclosure has following effects:

By regarding the vehicles driving in a same direction and in communication as a single V2X communication group, when receiving a request for resource scheduling sent by the V2X communications group, allocating communication resource for the V2X communication group. In this way, a frequency of resource allocation can be reduced according to the resource allocation method based on the V2X communication group, thus vehicle communication link and channel quality in the communication group can be stable, and a performance of an Internet of vehicles can be fully realized.

BRIEF DESCRIPTION OF THE DRAWINGS

In order to describe the technical solutions in embodiments of the present disclosure or in the prior art more clearly, the following briefly introduces the accompanying drawings are needed for describing the embodiments. The accompanying drawings in the following description show some embodiments of the present disclosure, and persons of ordinary skill in the art may still derive other drawings from these accompanying drawings without effort.

DETAILED DESCRIPTION

The following clearly and completely descriptions the technical solutions in the embodiments of the present disclosure is with reference to the accompanying drawings in the embodiments of the present disclosure. The described embodiments are a part rather than all of the embodiments of the present disclosure. All other embodiments acquired by persons of ordinary skill in the art based on the embodiments of the present disclosure without creative efforts shall fall within the protection scope of the present disclosure.

Figure 1:
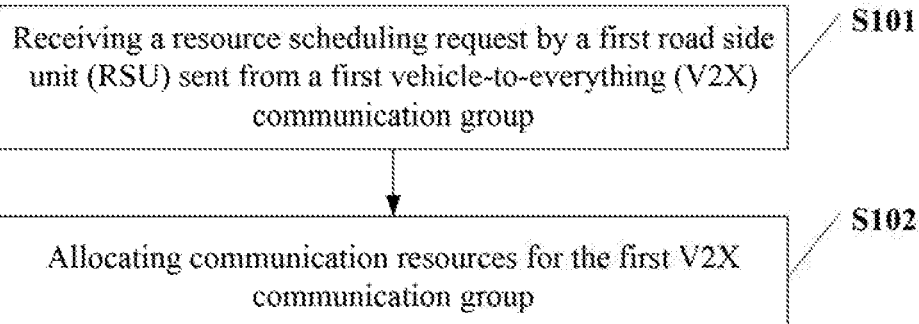
FIG. 1 is a flow diagram of a resource allocation method provided in a first embodiment of the present disclosure.

FIG. 1 shows a flow diagram of a resource allocation method provided in a first embodiment of the present disclosure, in this embodiment, the method includes the following steps:

Step 101, a first road side unit (first RSU) receives a resource scheduling request sent from a first vehicle-to-everything (Vehicle to X, V2X) communication group.

Step 102, allocating communication resources for the first V2X communication group.

In which, the first V2X communication group includes vehicles in a same driving direction.

The V2X can include information exchange between a vehicle and a vehicle (V2V), information exchange between a vehicle and an infrastructure (V2I), and information exchange between a vehicle, and a nomadic device (V2N), even information exchange between a vehicle and the Internet. Therefore, the V2X communication group here can include the vehicle and the network-side infrastructure, which corresponds to a communication scenario of the V2I.

Or the first V2X communication group can be a V2V direct communication group, the vehicle initiating a communication can communicate directly with a target vehicle.

Or the first V2X communication group can be a V2V relay communication group or a V2I relay communication group, the vehicle initiating the communication can communicate with the target vehicle through a relay node, the relay node includes a cellular user terminal, a vehicle, or an RSU providing a relay communication service.

The V2V refers to a direct or indirect communication between vehicles, such as resource sharing between the vehicles or a promulgation of information, etc. In a V2V scenario, speeds of different vehicles are not relatively constant, stability of communication links between the vehicles driving in different and opposite directions depends on a speed of the vehicle. In general, the link is often interrupted within a short time period due to relative velocity of the separating motion being multiplied, therefore, except for a traffic congestion and other special circumstances, this is not a typical V2V scenario. In contrast, the vehicles driving in the same direction may rely on power control, trajectory prediction and other means to achieve relatively stable V2V communication at a certain speed. Therefore, the V2V vehicles can be grouped together, and resources are allocated based on the V2V communication group. Since the vehicle coma communication in the same communication group is relatively stable, it is not necessary for the vehicles in the V2V communication group to frequently schedule resources. However, the vehicles moving in the same direction may keep moving in a same order, within an coverage area of adjacent RSUs, V2V matching with the same resource block can push the occupied resources forward like an assembly line for a time period. Vehicles may not have to frequently make request to the RSU for scheduling resources, and when a distance between vehicle groups in different RSU areas exceeds an interference distance, the same time-frequency resource can be reused to improve resource utilization.

If the first V2X communication group includes the vehicles and the network-side infrastructures, then the first RSU obtains a traffic density of a driving road section of the first V2X communication group, and compares the obtained traffic density with, a preset density threshold;

When the obtained traffic density is less than the preset density threshold, resource is allocated for the vehicles in the first V2X communication group according to the resource scheduling request of the first V2X communication group, and the vehicles are allowed to keep the allocated resources at the driving road section. The second RSU is informed of the resource occupancy information of the first V2X communication group.

If the obtained traffic density is more than the preset density threshold, every time that the vehicle in the first V2X communication group initiates a resource scheduling request, the resource is allocated for the vehicles in the first V2X communication group according to an allocation principle based on polling or equal proportion.

The V2I communication is when first V2X communication group includes the vehicles and the network-side infrastructures. The V2I communication refers to communication between the vehicles and infrastructure (such as an RSU). Other than mobility of communication entities in the V2V scenario, the infrastructures in the V2I are generally static. This means that the V2I must undergo a frequent switching between the vehicles and the RSU in order to maintain consistent communication behavior. In a city, methods for allocating resources during heavy traffic and sparse traffic time can also be, different. When traffic is crowded, the vehicle moves slowly, and the traffic density is high, thus, the communication resources of V2I need to make request for every communication. Moreover, if resources need to be allocated for the V2V communication groups, in order to reduce signaling overhead, resource requests for multiple V2V communication pairs are grouped and allocated according to relative speed conditions between different V2V communication groups. When the traffic is sparse, a number of resources available within a single RSU coverage exceeds a number of vehicles. Then, a process of requesting resources from the vehicles can be simplified. Vehicles can keep using the same resources at certain road sections without having to request resources frequently, in order to simplify the signaling process and keep communication flowing. The resources are managed by the vehicles on the RSU side.

In the present embodiment, by nominally placing vehicles in the same direction and in communication in a single V2X communication group, allocating communication resource for the V2X communication group when receiving a request for resource scheduling sent by the V2X communications group. In this way, a frequency of resource allocation can be reduced according to the resource allocation method based on the V2X communication group, thus, vehicle communication link and channel quality in the communication group can be stable, and a performance of the Internet of vehicles can be fully realized.

Figure 2:
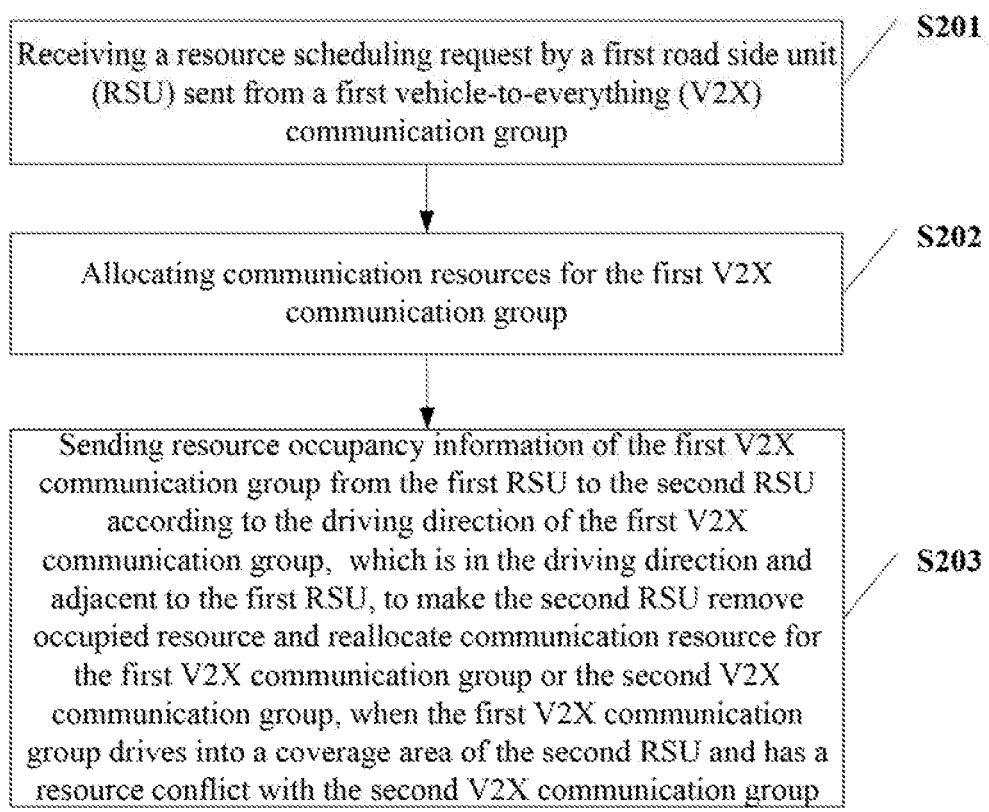
FIG. 2 is a flow diagram of the resource allocation method provided in a second embodiment of the present disclosure.

Referring to FIG. 2, FIG. 2 is a flow diagram of the resource allocation method provided in a second embodiment of the present disclosure. In the present embodiment, steps S201-S202 are the same as steps S101-S102, thus, are not repeated here. After executing, the step S202, the same as step S102, the method can also include the following steps:

Step S203, according to the driving direction of the first V2X communication, group, the first RSU sends the resource occupancy information of the first V2X communication group to the second RSU, which is in the driving, direction and adjacent to the first RSU. Thus, the second RSU can remove the resource occupancy and reallocate communication resource for the first V2X communication group or the second V2X communication group, when the first V2X communication group drives into a coverage area of the second RSU and has a resource conflict with the second V2X communication group.

The resource occupancy information can include, but is not limited to resource information occupied by the V2X communication group, identification information of vehicles in the V2X communication group, a vehicle geographical location, a vehicle speed, and information that indicates whether the V2X communication is supported.

The vehicles moving in the same direction may keep moving in the same order, so for a period of time, within a coverage area of the adjacent RSUs, V2V matching with the same resource block can push the occupied resources forward like an assembly line for a time period. Vehicles may not have to frequently request to the RSU for scheduling resources. Instead, the RSU informs other RSU of the occupied resource blocks and performs management. According to the reality, the RSU can decide whether to remove resources occupied by vehicles that use existing resources in the forward direction, or remove the resources occupied by other vehicles that enter the coverage range of the RSU, it may cause resource conflicts in the backward direction.

At this point, a definition of removing the occupied resources is that the RSU (or the base station) prohibits a designated vehicle pair or communication group from using the allocated resource or resource pool in a form of empty signaling RSU interface signaling (or base station interface signaling), and reassigns the available resource or a resource pool to the designated vehicle pair or the communication group.

The following is a detailed description of the specific application in different scenarios with reference to FIGS. 4-9.

Figure 4:
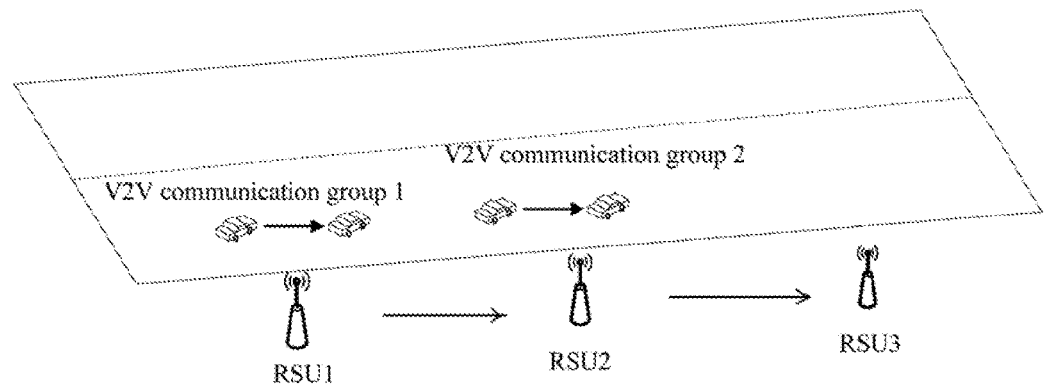
FIG. 4 is a schematic structural diagram of a direct communication in V2V scene provided in the present disclosure.
Figure 5:
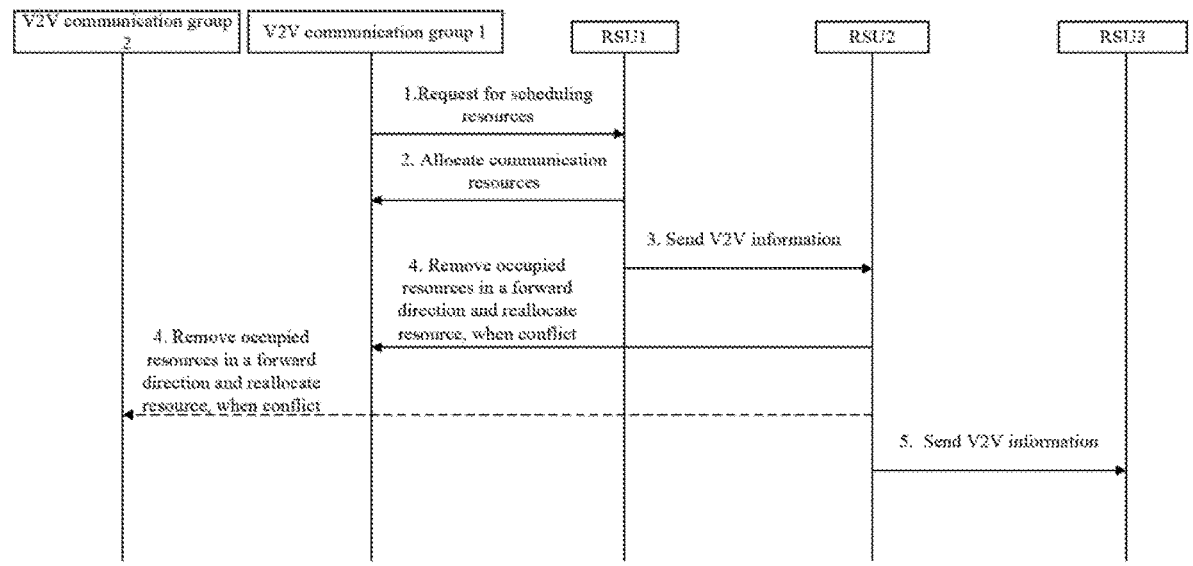
FIG. 5 is an information interaction diagram of the resource allocation method of the second embodiment applied to the schematic of the FIG. 4 provided in the present disclosure.

Referring to FIGS. 4 and 5, in which, FIG. 4 shows a schematic structural diagram of a direct communication of V2V scene and FIG. 5 shows an information interaction diagram of the resource allocation method of the second embodiment applied to the schematic of FIG. 4 provided in the present disclosure. As shown in FIG. 4, a first V2X communication group and a second V2X communication group (represented by a V2X communication group 1 in the figure) are included, and both members of the V2X communication group 1 are V2V direct communication groups represented by a V2V communication group 1 and V2V communication group 2 in FIG. 4). There are three RSUs, RSU1, RSU2, and RSU3 distributed successively in the driving direction of the two communication groups.

Due to multidirectional mobility characteristic of the V2V communication parties, when a V2V communication with neighboring vehicles is needed, the vehicle requests the RSU for resource scheduling. Both of the V2V communication parties communicate directly on the allocated resources based on the PC5 link, in a traditional resource allocation solution of the Internet of vehicles, only the resources allocation to individual vehicles is considered, without considering a resources allocation solution based on vehicle, pairs or vehicle groups caused by communication characteristics of distances of vehicles in sight. Effective time of the resources allocated to the vehicle is determined by the RSU. The vehicles periodically report their own information, which can include, but is not limited to geographical location information, a speed, identification information of vehicles, and information that indicates whether the V2X communication is supported. If the RSU needs vehicle geographic information to allocate resources, the vehicle geographic information can be obtained by a trajectory measured by the geographic location information and speed reported periodically by the vehicle. As shown in FIG. 4, when the V2V communication group 1 moves forward, the V2V communication group 2 also moves forward, they can reuse same time-frequency resources when a distance between them exceeds an interference-prone distance.

If the V2V communication group 1 drives into a coverage area of the RSU2 and the V2V communication group 2 has left the coverage area of the RSU2, the V2V communication group 1 and the V2V communication group 2 can continue to use same resources to communicate.

If the V2V communication group 1 has driven into the coverage area of the RSU2 before the V2V communication group 2 leaves the coverage area of the RSU2, the RSU2 can predict a driving trajectory of the V2V communication group 1. This is done according to a vehicle identification, a speed, and other information of the V2V communication group 1 transmitted in advance by RSU1, and a selection can be made as to whether to remove resources occupied by the V2V communication group 2 in a forward direction and reallocate resource for the V2V communication group 2, or to remove resources occupied by the V2V communication group 1 in a backward direction for reallocating the resource for the V2V communication group 1.

The significance of the difference between resource removal in the forward direction, or in the backward direction is that when there are different V2X, communication links/link groups reusing a same resource block, the RSU can decide to allocate resources to which entity based on an implementation principles of convenience. For example, a V2V relay communication group includes three vehicles and a V2I communication group includes a single vehicle and an RSU reusing the same resource block in adjacent areas. When the two communication groups enter into an interference range and the reused resources are conflicting, a scheduling signal required by the RSU for reallocating the resources for a single-vehicle is significantly simpler than that for three vehicles. Therefore, whether the V2V relay communication group of the three vehicles occupies the reused resource block firstly or secondly, a simpler method can be chosen, that is a resources reallocation method for the V2I communication pair of a single-vehicle.

The specific process can refer to FIG. 5:
1. The V2V communication group 1 requests scheduling resources.
2. The RSU1 responds to the request and allocates communication resources for the V2V communication group 1.
3. The RSU1 sends the resources currently occupied by the current V2V communication group 1, the identification of communication vehicles, the speed and other information thereinafter referred to "V2V information") to next RSU in the driving direction, that is, the RSU2.
4. If resource to be used has been occupied when the V2V communication group 1 drives into a coverage area of the RSU2, the resource occupied is removed in the forward direction and the resource is reallocated for the V2V communication group 2 or for the V2V communication group 1.
5. The RSU2 sends the V2V information to the next RSU in the driving direction, that is, the RSU3.

When a distance from a vehicle to another vehicle exceeds a practical communication distance, V2V direct communication mode is terminated, and switched to the V2V relay communication. Alternatively, the V2I relay communication can be switched.

Figure 6:
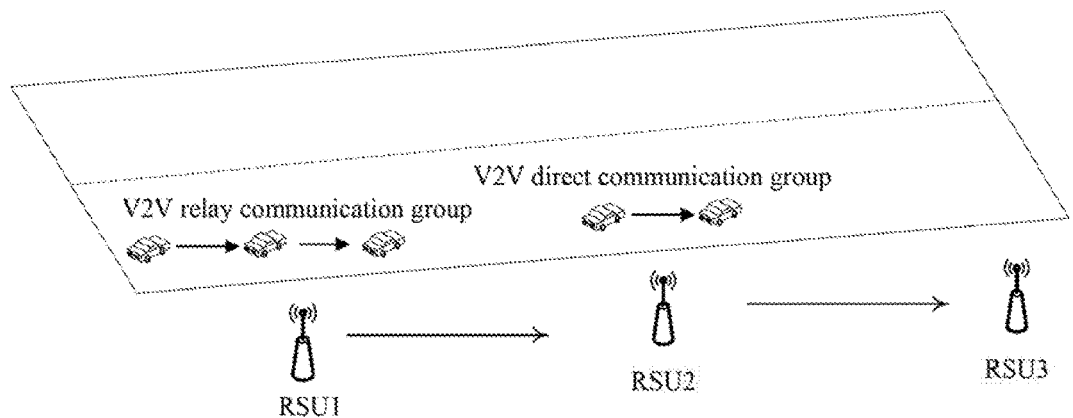
FIG. 6 is one schematic structural diagram of a relay communication in V2V scene provided in the present disclosure.
Figure 7:
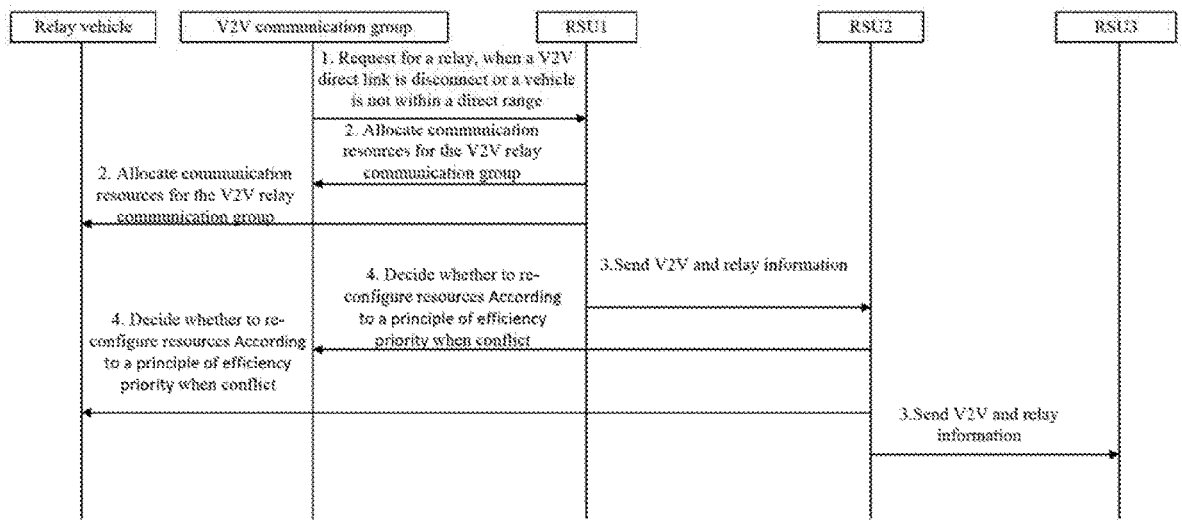
FIG. 7 is an information interaction diagram of the resource allocation method of the second embodiment applied to the schematic of the FIG. 6 provided in the present disclosure.

Please referring to FIGS. 6 and 7, in which, FIG. 6 shows one schematic structural diagram of a relay communication of V2V scene provided in the present disclosure. FIG. 7 is an information interaction diagram of the resource allocation method of the second embodiment applied to the schematic of FIG. 6 provided in the present disclosure. As shown in FIG. 6, a first V2X communication group and a second V2X communication group are included, the first V2X communication group is a V2V relay communication group, and the second V2X communication group is a V2V direct communication group. There are three RSUs, RSU1, RSU2, and RSU3 distributed successively in the driving direction of the two communication groups.

The relay node is the vehicle, detailed information of interaction process can be seen in FIG. 7:
1. When the V2V direct link is disconnected or the vehicle is not within a direct range, requesting for a relay.
2. The RSU1 responds to the request and allocates communication resources for the V2V relay communication group.
3. The RSU1 sends the resources occupied by a V2V communication pair, the identification of communication vehicles (including relay vehicles), the speed, and other information (hereinafter referred to "V2V and relay information") to the next RSU in the driving direction, that is, the RSU2.
4. If resource to be used has been occupied when the V2V relay communication group drives into a coverage area of the RSU2, then according to a principle of efficiency priority or performance priority, the resource occupied is removed in a forward direction or in a backward direction and the resource is reallocated.
5. The RSU2 sends a current V2V and relay information to a next RSU in the driving direction, that is, the RSU3.

Figure 8:
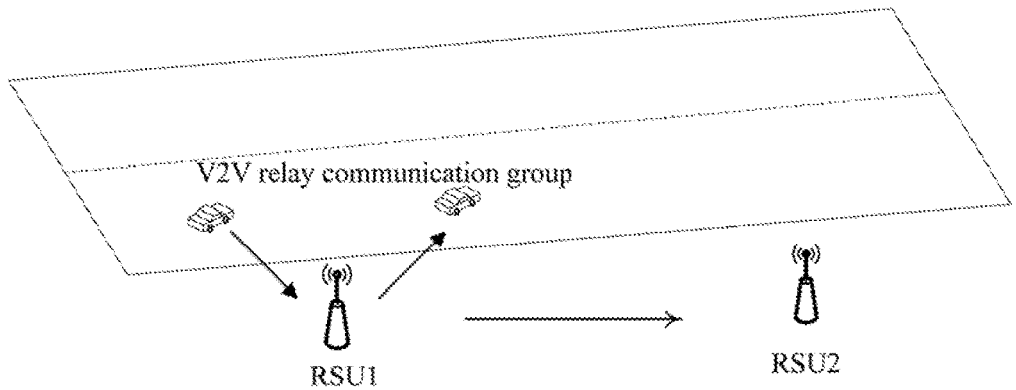
FIG. 8 is another schematic structural diagram of the relay communication of V2V scene provided in the present disclosure.
Figure 9:
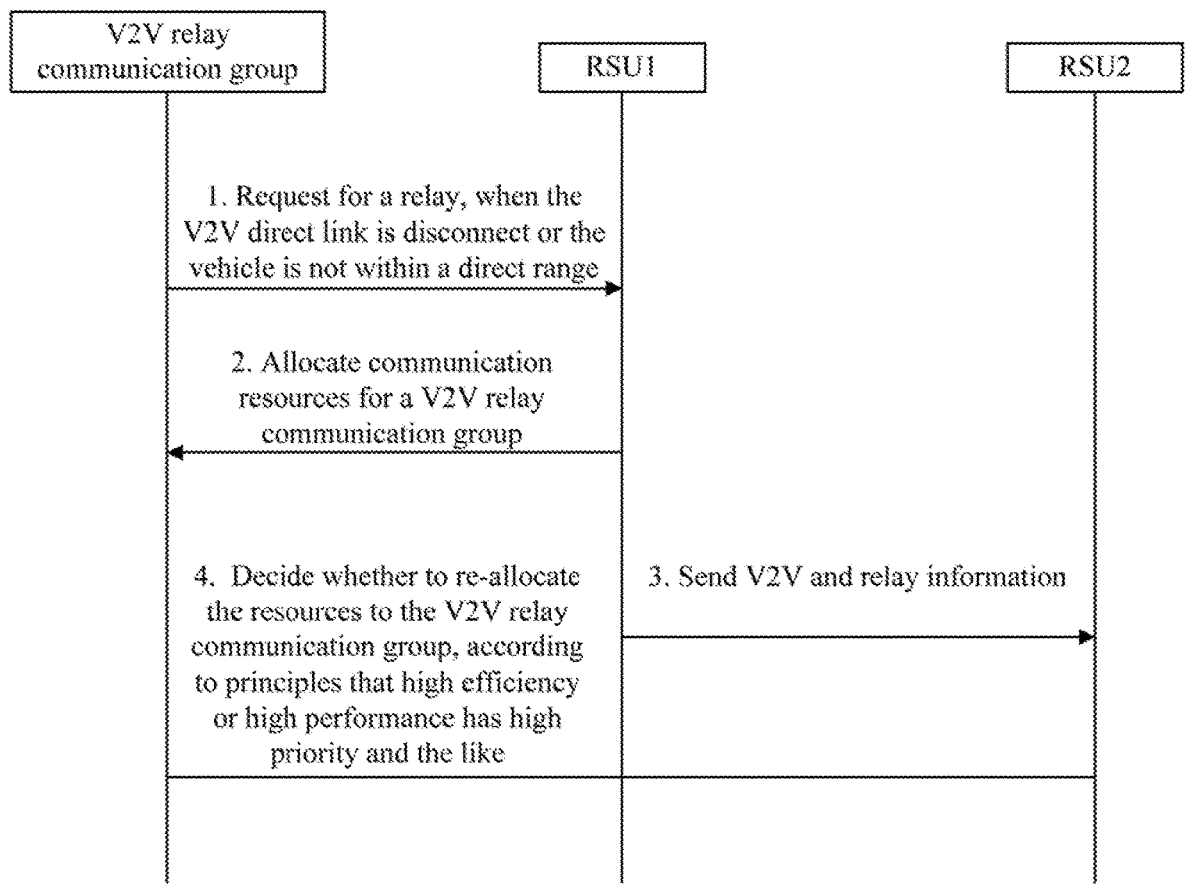
FIG. 9 is an information interaction diagram of the resource allocation method of the second embodiment applied to the schematic of the FIG. 8 provided in the present disclosure.

Referring to FIGS. 8 and 9, in which. FIG. 8 shows another schematic structural diagram of the relay communication of V2V scene provided in the present disclosure, FIG. 9 shows an information interaction diagram of the resource allocation method of the second embodiment applied to the schematic of FIG. 8 provided in the present disclosure. As shown in FIG. 8, a first V2X communication group is included. The first V2X communication group is a V2V relay communication group. There are three RSUs, RSU1, RSU2, and RSU3, distributed successively in the driving direction of the communication group.

The relay node is the RSU, detailed information of interaction process can be seen in FIG. 9:
1. When the V2V direct link is disconnected or the vehicle is not within a direct range, requesting for a relay.
2. The RSU1 responds to the request and allocates communication resources for the V2V relay communication group, and undertakes a relay task.
3. The RSU1 sends the current V2V and relay information to next RSU in the driving direction, that is, the RSU2.
4. If resource to be used has been occupied when the V2V relay communication group drives into a coverage area of the RSU2, then according to principles of high efficiency or high performance having high priority and the like, deciding whether to re-allocate the resources to the V2V relay communication group.

The RSU servers as a V2V relay communication of a relay node, which includes PC5 link relay communication with a terminal type RSU as, the relay node, and also includes PC5/Uu link relay communication with, a base station type RSU as the relay node.

Figure 3:
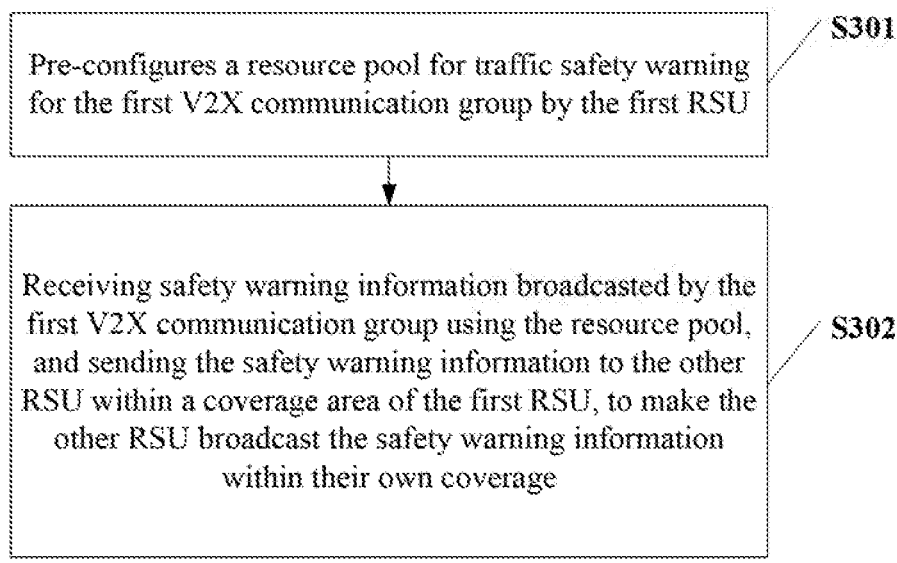
FIG. 3 is a flow diagram of the resource allocation method provided in a third embodiment of the present disclosure.

Referring to FIG. 3, FIG. 3 shows a flow diagram of the resource allocation method provided in a third embodiment of the present disclosure, in the present embodiment, the method includes the following steps:

Step S301, the first RSU pre-configures a resource pool for traffic safety warning for the first V2X communication group.

Step S302, receiving safety warning information broadcast by the first V2X communication group using the resource pool, and sending the safety warning information to the other RSU within a coverage area of the first RSU, so that the other RSU can broadcast the security warning information within its own coverage.

For emergency actions related to traffic safety, vehicles are sometimes too late to initiate resource scheduling requests to base stations or the RSU. For example, when the vehicle applies for resource scheduling to the base station or RSU, a delay caused by the resource scheduling exceeds the response speed of the driver, accidents are hard to avoid in case of emergency braking, a high-speed accident, or obstruction of vision in foggy weather. The resource pool dedicated for a traffic safety for the vehicle is needed, so that the vehicle can carry out an active emergency safety alert for other vehicles in case of an accident.

V2X resource allocation for emergency actions related to vehicle safety should generally be pre-allocated to ensure resource availability in emergencies. Because a probability of the occurrence of traffic safety events is generally small, a size of the required pre-allocated resource pool can be small. In case of emergency, the vehicle can carry out the traffic safety warning by using a radio on the pre-allocated resource pool or other means.

Figure 10:
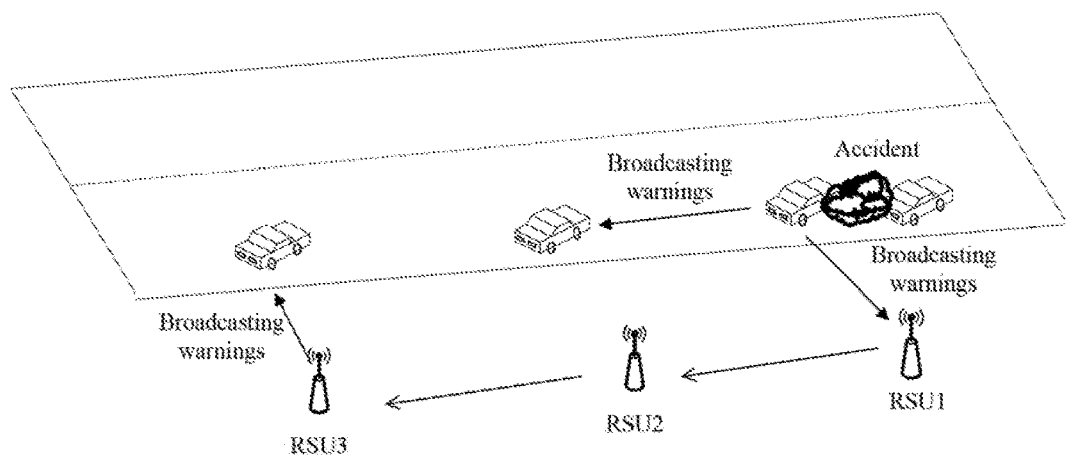
FIG. 10 is a schematic structural diagram of a safety warning in V2V scene provided in the present disclosure.
Figure 11:
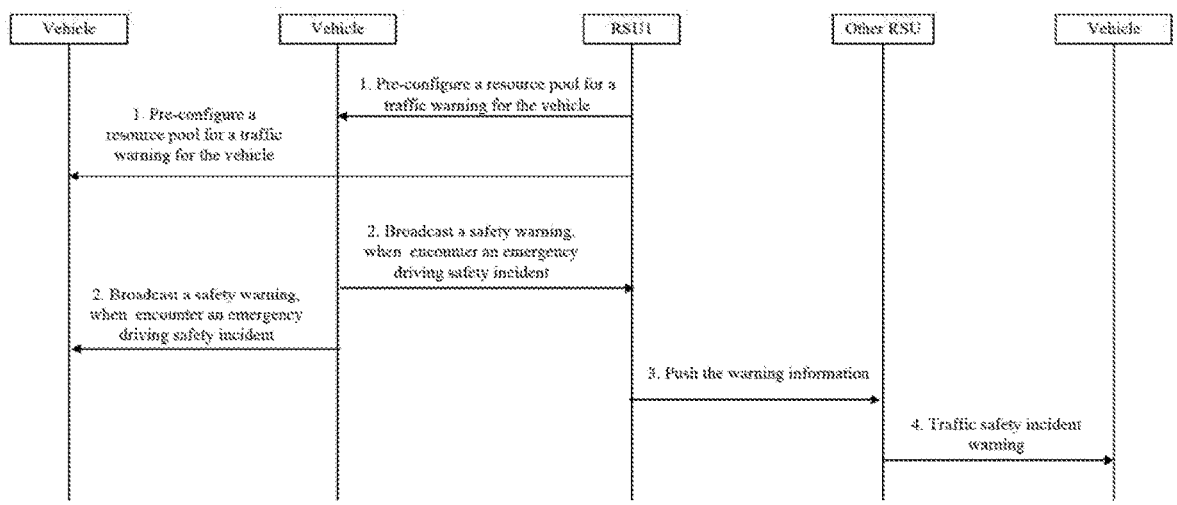
FIG. 11 is an information interaction diagram of the resource allocation method of the third embodiment applied to the schematic of the FIG. 10 provided in the present disclosure.

Referring to FIGS. 10 and 11, where, the FIG. 10 shows a schematic structural diagram of a safety warning of V2V scene provided in the present disclosure. FIG. 11 is an information interaction diagram of the resource allocation method of the third embodiment applied to the schematic of the FIG. 10 provided in the present disclosure. As shown in FIG. 10, a vehicle on the right side has an accident, and it can broadcast safety warning information to surrounding vehicles and RSU with pre-allocated resources. A detailed information of interaction process can be seen in FIG. 11:
1. RSU pre-allocates a resource pool for traffic safely warning for the vehicles.
2. When vehicles encounter an emergency driving safety incident, broadcasting a safety warning to surrounding devices with the pre-allocated resources.
3. RSU receiving traffic safety warning information can transmit the warning information to other RSU.
4. The other RSUs can transmit the warning information of traffic safety events to other vehicles within their own coverage.

It should be noted that, for simplicity, resource allocation in the above embodiments are done by RSU. In some scenarios, the RSU may also need to communicate with the base station to complete resource scheduling.

Figure 12:
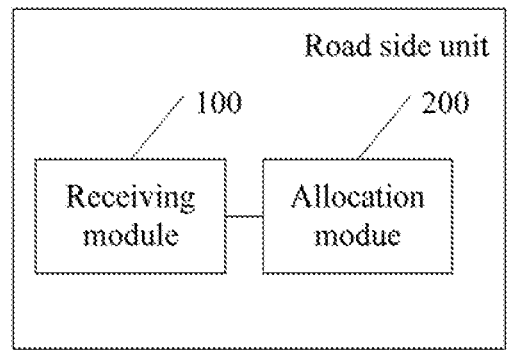
FIG. 12 is a structure diagram of a road side unit provided in a first embodiment of the present disclosure.

Referring to FIG. 12, FIG. 12 is a structure diagram of an RSU provided in a first embodiment of the present disclosure. In this embodiment, the RSU includes:

A receiving module 100, configured to receive a resource scheduling request sent from a first-to-everything (Vehicle to X, V2X) communication group.

An allocation module 200, configured to allocate communication resources for the first V2X communication group.

Wherein the first V2X communication group includes vehicles in a same driving direction.

Optionally, the first V2X communication group can include vehicles and network-side infrastructures.

Or the first V2X communication group can be a vehicle-to-vehicle (V2V) direct communication group, the vehicle initiating a communication can communicate directly with a target vehicle.

Or the first V2X communication group can be a V2V relay communication group, the vehicle initiating the communication can communicate with the target vehicle through a relay node. The relay node includes a cellular user with terminal, a vehicle, or an RSU providing a relay communication service.

Figure 13:
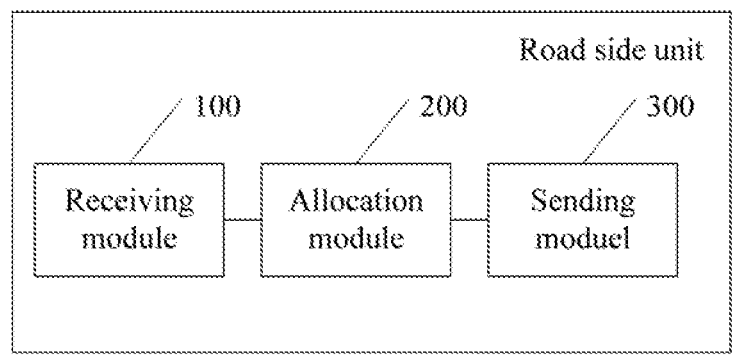
FIG. 13 is a structure diagram, of the road side unit provided in a third embodiment of the present disclosure.

Referring to FIG. 13, FIG. 13 shows a structure diagram of an RSU provided in a second embodiment of the present disclosure. Compared with the embodiment shown in FIG. 12, the RSU in this embodiment also includes:

A sending module 300, configured to, according to the driving direction of the first V2X communication group, send the resource occupancy information of the first V2X communication group to the second RSU, which is in the driving direction and adjacent to the first RSU. Thus, the second RSU can remove the resource occupancy and reallocate communication resource for the first V2X communication group or the second V2X communication group, when the first V2X communication group drives into a coverage area of the second RSU and has a resource conflict with the second V2X communication group.

Optionally, if the first V2X communication group includes the vehicles and the network-side infrastructures, then the receiving module 100 is also configured to obtain a traffic density of the a driving road section of the first V2X communication group from a traffic density monitoring device, and compare the obtained traffic density with a preset density threshold;

When the obtained traffic density is less than the preset density threshold, then the allocation module 200 is also configured to allocate resources for the vehicles the first V2X communication group according to the resource scheduling request of the first V2X communication group, and allow the vehicles to keep the allocated resources at the driving road section. The sending module 300 is also configured to inform the second RSU of the resource occupancy information of the first V2X communication group.

If the obtained traffic density is more than the preset density threshold, every time that the vehicle in the first V2X communication group initiates a resource scheduling request, the allocation module 200 is also configured to allocate resource for the vehicles in the first V2X communication group according to an allocation principle based on polling or equal proportion.

Optionally, the allocation module 200 is also configured to pre-allocate a resource pool for traffic safety warning for the first V2X communication group.

The receiving module 100 is also configured to receive safety warning information broadcast by the first V2X communication group using the resource pool. The sending module 300 is also configured to send the safety warning information to the other RSUs within a coverage area of the first RSU, so that the other RSUs can broadcast the security warning information within their own coverage.

The above receiving unit 100, the allocation unit 200, and the sending unit 300 can be independently arranged and also can be integrated. The receiving unit 100, the allocation unit 200, and the sending unit 300 can be independently arranged in a hardware form independent of a processor of the RSU. The hardware form can be a microprocessor, and can also be embedded in the processor of the road side unit in a hardware form, it can also be stored in a memory of the road side unit in a software form. Thus the processor of the road side unit can invoke the above receiving unit 100, the allocation unit 200, and the sending unit 300, to execute operations.

For example, in the second embodiment of the present disclosure of the RSU (the embodiment shown in FIG. 13), the allocation module 200 can be a processor of the RSU, but the receiving unit 100 and the sending unit 300 can be embedded in the processor, or can be arranged independent of the processor They can also be stored in the memory in the form of software and functions can be invoked by the processor. The embodiments of the present disclosure are not limited in any way. The above processor can be a central processing unit (CPU), a microprocessor, a single-chip microcontroller, etc.

It should be noted that, while various embodiments in the specification are described in a progressive manner, each of the embodiments highlights differences from the other embodiments. Similar descriptions of all the embodiments can refer to each other. For embodiments of the RSU, they are basically similar to the method embodiments, thus, the descriptions of the RSUs are simple, relevant descriptions can refer to the part of the method embodiments.

Through the descriptions of the above embodiments, the disclosure presents the following advantages:

By regarding the vehicles in the same direction and in communication as the V2X communication group, and when receiving a request for resource scheduling send by the V2X communications group, allocating communication resource for the V2X communication group. In this way, a frequency of resource allocation can be reduced according to the resource allocation method based on the V2X communication group, thus, vehicle communication link and channel quality in the communication group can be stable, and performance of an Internet of vehicles can be fully realized.

Figure 14:
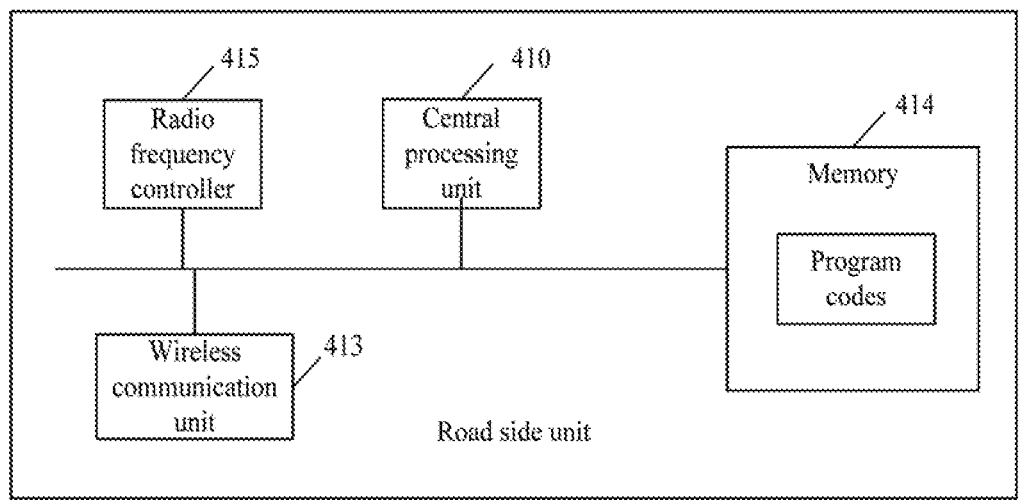
FIG. 14 is a structure diagram of a road side unit provided in the disclosure.

FIG. 14 shows a structure diagram of an RSU provided in the present disclosure. The RSU in the embodiment of the present disclosure includes at least one processor 410, such as a central processing unit (CPU), at least one wireless communication unit 413, at least one memory 414, and at least one radio frequency controller 415. Herein, the wireless communication unit 413 can be a 3rd Generation (3G) communication unit. The radio frequency controller 415 can be used for controlling transmission and receiving data and processing messages front an upper computer. The memory 514 can be a high-speed random access memory (RAM) or a non-volatile memory The processor 410 can execute various application programs and program codes installed in the RSU, for example, each of the various modules as mentioned above, including the receiving module 100, the sending module 300, etc.

The memory 414 stores program codes, and the processor 510 can invoke the program codes stored in the memory 414 to perform functions. For example, each of the various modules in FIGS. 12 and 13 (e.g., the receiving module 100, the sending module 300, etc.) are program codes stored in the memory 414 and are executed by the processor 410, to perform the functions of the road side unit and various modules for allocating resources.

In one embodiment of the present disclosure, the memory 514 stores a plurality of instructions, and the plurality of instructions are executed by the processor 510 to realize the resources allocation method. Specifically, the executions of the plurality if instructions by the processor 510 includes receiving a resource scheduling request sent from a first vehicle-to-everything (Vehicle to X, V2X) communication group, and allocating communication resources for the first V2X communication group, wherein the first V2X communication group includes vehicles in a same driving direction.

In a further embodiment, according to the driving direction of the first V2X communication group, the first RSU sends a resource occupancy information of the first V2X communication group to the second RSU, which is in the driving direction and adjacent to the first RSU. Thus the second RSU clears the resource occupancy and reallocates communication resource for the first V2X communication group or the second V2X communication group, when the first V2X communication group drives into a coverage area of the second RSU and has a resource conflict with the second V2X communication group.

In a further embodiment, the first V2X communication group include vehicles and network-side infrastructures. Alternatively, the first V2X communication group is a vehicle-to-vehicle (V2V) direct communication group, and the vehicle initiating a communication communicates directly with a target vehicle. Possibly, the first V2X communication group is a V2V relay communication group, the vehicle initiates the communication communicate with the target vehicle through a relay node, the relay node includes a cellular terminal, a vehicle, or air RSU providing a relay communication service.

In a further embodiment, if the first V2X communication group includes the vehicles and the network-side infrastructures, then the first RSU obtains a traffic density of a driving road section of the first V2X communication group, and compares the obtained traffic density with a preset density threshold. When the obtained traffic density is less than the preset density threshold, then allocating resource for the vehicles in the first V2X communication groups according to the resource scheduling request of the first V2X communication group, and allowing the vehicles to keep the allocated resources at the driving road section. The second RSU is informed of the resource occupancy information of the first V2X communication group; if the obtained traffic density is more than the preset density threshold, then every time the vehicle in the first V2X communication group initiates a resource scheduling request, allocating resource for the vehicles in the first V2X communication group according to an allocation principle based on polling or equal proportion.

In a further embodiment, the first RSU pre-configures a resource pool for traffic safety warning for the first V2X communication group; receiving safety warning information broadcast by the first V2X communication group using the resource pool, and sending the safety warning information to the other RSUs within a coverage area of the first RSU, so that the other RSUs can broadcast the safety warning information within their own coverage.

Both the first RSU and the second RSU in the above embodiment can perform the above method through their respective processors (e.g., processor 410).

Specifically, specific implementation method of the above instruction performed by the processor 410 can refer to the description of relevant steps in the embodiments of FIGS. 1-3, and such description is not repeated.

Persons of ordinary skill in the art can understand that realization of all or part of the procedures in the method of the above embodiments can be realized by instructing relevant hardware through a computer program, the program can be stored in a computer readable storage medium. When the program is executed, the program can include the flow of the embodiments of the above methods. The storage medium can be a magnetic disk, an optical disk and a read-only memory (ROM), or a random access memory (RAM) etc.

The above mentioned descriptions are merely preferred embodiments of the present disclosure, and should not limit the scope of the present disclosure. Thus, any modification and equivalent according to the claims of the present disclosure is still within the scope of the present disclosure.

What is claimed is:

1. A resource allocation method executed in a first road side unit (RSU), comprising:
    receiving a resource scheduling request by the first road side unit (RSU), sent from a first vehicle-to-everything (V2X) communication group, which comprises vehicles in a same driving direction;
    allocating communication resources for the first V2X communication group;
    in response that the first V2X communication group comprises the vehicles and the network-side infrastructures, obtaining a traffic density of the driving road section of the first V2X communication group, and comparing the obtained traffic density with a preset density threshold by the first RSU;
    in response that the obtained traffic density is less than the preset density threshold, allocating resource for the vehicles in the first V2X communication groups according to the resource scheduling request of the first V2X communication group, and allowing the vehicles to keep the allocated resources at the driving road section, informing a second RSU of the resource occupancy information of the first V2X communication group;
    in response that the obtained traffic density is more than the preset density threshold, every time that the vehicle in the first V2X communication group initiates a resource scheduling request, allocating the resource for the vehicles in the first V2X communication group according to an allocation principle based on a polling or equal proportion;
    according to the driving direction of the first V2X communication group, sending resource occupancy information of the first V2X communication group from the first RSU to the second RSU, which is in the driving direction and adjacent to the first RSU, to make the second RSU remove occupied resource and reallocate communication resource for the first V2X communication group or a second V2X communication group, when the first V2X communication group drives into a coverage area of the second RSU and has a resource conflict with the second V2X communication group.

2. The resource allocation method of claim 1, wherein; the first V2X communication group comprises vehicles and network-side infrastructures.

3. The resource allocation method of claim 1, wherein; the first V2X communication group is a vehicle-to-vehicle (V2V) direct communication group, the vehicle initiating a communication to communicate directly with a target vehicle.

4. The resource allocation method of claim 1, wherein;
the first V2X communication group is a V2V relay communication group, the vehicle initiating the communication to communicate with the target vehicle through a relay node, the relay node comprising a cellular user terminal, a vehicle, or a RSU providing a relay communication service.

5. A road side unit, comprising:
at least one processor; and
a storage device storing a plurality of instructions, which when executed by the processor, causes the at least one processor to:
receive a resource scheduling request by a first road side unit (RSU) sent from a first vehicle-to-everything (V2X) communication group, which comprises vehicles in a same driving direction;
allocate communication resources for the first V2X communication group;
in response that the first V2X communication group comprises the vehicles and the network-side infrastructures, obtains a traffic density of the driving road section of the first V2X communication group, and compares the obtained traffic density with a preset density threshold by the first RSU;
in response that the obtained traffic density is less than the preset density threshold, allocates resource for the vehicles in the first V2X communication groups according to the resource scheduling request of the first V2X communication group, and allows the vehicles to keep the allocated resources at the driving road section, informs a second RSU of the resource occupancy information of the first V2X communication group;
in response that the obtained traffic density is more than the preset density threshold, every time that the vehicle in the first V2X communication group initiates a resource scheduling request, allocates resource for the vehicles in the first V2X communication group according to an allocation principle based on a polling or equal proportion;
send a resource occupancy information of the first V2X communication group to the second RSU in the driving direction and adjacent to the first RSU, according to the driving direction of the first V2X communication group, to make the second RSU remove occupied resource and reallocate communication resource for the first V2X communication group or a second V2X communication group, when the first V2X communication group drives into a coverage area of the second RSU and has a resource conflicts with the second V2X communication group.

6. The road side unit of claim 5, wherein;
the first V2X communication group comprises vehicles and network-side infrastructures.

7. The road side unit of claim 5, wherein;
the first V2X communication group is a vehicle-to-vehicle (V2V) direct communication group, the vehicle initiating communication to communicate directly with a target vehicle.

8. The road side unit of claim 5, wherein;
the first V2X communication group is a V2V relay communication group, the vehicle initiating communication to communicate with a target vehicle through a relay node, the relay node comprising a cellular user terminal, a vehicle, or a RSU providing a relay communication service.

9. A non-transitory storage medium having stored thereon instructions that, when executed by a processor of a first road side unit (RSU), causes the first RSU to perform a resource allocation method, the method comprising:
receiving a resource scheduling request by the first RSU, sent from a first vehicle-to-everything (V2X) communication group, which comprises vehicles in a same driving direction;
allocating communication resources for the first V2X communication group;
in response that the first V2X communication group comprises the vehicles and the network-side infrastructures, obtaining a traffic density of the driving road section of the first V2X communication group, and comparing the obtained traffic density with a preset density threshold by the first RSU;
in response that the obtained traffic density is less than the preset density threshold, allocating resource for the vehicles in the first V2X communication groups according to the resource scheduling request of the first V2X communication group, and allowing the vehicles to keep the allocated resources at the driving road section, informing a second RSU of the resource occupancy information of the first V2X communication group;
in response that the obtained traffic density is more than the preset density threshold, every time that the vehicle in the first V2X communication group initiates a resource scheduling request, allocating the resource for the vehicles in the first V2X communication group according to an allocation principle based on a polling or equal proportion;
according to the driving direction of the first V2X communication group, sending resource occupancy information of the first V2X communication group from the first RSU to the second RSU, which is in the driving direction and adjacent to the first RSU, to make the second RSU remove occupied resource and reallocate communication resource for the first V2X communication group or a second V2X communication group, when the first V2X communication group drives into a coverage area of the second RSU and has a resource conflict with the second V2X communication group.

10. The non-transitory storage medium of claim 9, wherein;
the first V2X communication group comprises vehicles and network-side infrastructures; or
the first V2X communication group is a vehicle-to-vehicle (V2V) direct communication group, the vehicle initiating a communication to communicate directly with a target vehicle; or
the first V2X communication group is a V2V relay communication group, the vehicle initiating the communication to communicate with the target vehicle through a relay node, the relay node comprising a cellular user terminal, a vehicle, or a RSU providing a relay communication service.

* * * * *